US006187221B1

(12) United States Patent
Gore et al.

(10) Patent No.: US 6,187,221 B1
(45) Date of Patent: Feb. 13, 2001

(54) CONTROLLED RELEASE BLEACH THICKENING COMPOSITION HAVING ENHANCED VISCOSITY STABILITY AT ELEVATED TEMPERATURES

(75) Inventors: Christopher G. Gore, Cartersville, GA (US); Sonya M. Steele, Chattanooga, TN (US)

(73) Assignee: National Starch and Chemical Investment Holding Corporation, Wilmington, DE (US)

( * ) Notice: Under 35 U.S.C. 154(b), the term of this patent shall be extended for 0 days.

(21) Appl. No.: 09/310,272

(22) Filed: May 12, 1999

(51) Int. Cl.[7] .............................. C01B 11/06; C11D 3/395

(52) U.S. Cl. .............................. 252/187.1; 252/187.24; 252/187.25; 252/187.26; 252/187.33; 252/187.34

(58) Field of Search .............................. 252/186.25, 186.34, 252/186.35, 186.36, 187.1, 187.24, 187.25, 187.26, 187.28, 187.33, 187.34

(56) References Cited

U.S. PATENT DOCUMENTS

| | | | |
|---|---|---|---|
| 4,554,091 | * 11/1985 | Jones et al. | 252/187.25 |
| 4,839,077 | 6/1989 | Cramer et al. | 252/98 |
| 4,867,896 | 9/1989 | Elliot et al. | 252/94 |
| 4,992,194 | * 2/1991 | Liberati et al. . | |
| 5,100,660 | 3/1992 | Hawe et al. | 424/78.35 |
| 5,160,655 | 11/1992 | Donker et al. | 252/95 |
| 5,169,552 | 12/1992 | Wise | 252/95 |
| 5,348,682 | 9/1994 | Finley et al. | 252/186.36 |
| 5,409,633 | 4/1995 | Clements et al. | 252/186.42 |
| 5,851,421 | 12/1998 | Choy et al. | 252/187.26 |

FOREIGN PATENT DOCUMENTS

| | | | |
|---|---|---|---|
| 0 256 638 | 2/1988 | (EP) | C11D/3/395 |
| 0 329 419 | 8/1989 | (EP) | C11D/17/00 |
| 0 373 864 | 6/1990 | (EP) | C11D/3/395 |
| 0 385 522 | 9/1990 | (EP) | C11D/3/39 |
| 0 421 738 | 4/1991 | (EP) | C11D/3/395 |
| 0 606 707 | 7/1994 | (EP) | C11D/3/395 |
| 0 606 712 | 7/1994 | (EP) | C11D/3/20 |
| 0 636 689 | 2/1995 | (EP) | C11D/3/39 |
| 0 636 691 | 2/1995 | (EP) | C11D/3/395 |
| 91/12307 | 8/1991 | (WO) | C11D/3/39 |

* cited by examiner

*Primary Examiner*—Joseph D. Anthony
(74) *Attorney, Agent, or Firm*—Thomas F. Roland, Esq.

(57) ABSTRACT

A controlled release bleach thickening composition comprising bleach, water, and 0.1 to 50 weight percent, based on the total weight of the controlled release bleach thickening composition, of at least one crosslinked carboxylated polymer which is prepared from 30 to 80 weight percent of at least one ethylenically unsaturated hydrophilic monomer, from 20 to 70 weight percent of at least one ethylenically unsaturated hydrophobic monomer, and from about 0.5 to about 10 weight percent of a degradable crosslinking monomer selected from the group consisting of a crosslinking monomer having at least two ethylenically unsaturated moieties, a crosslinking monomer having at least one ethylenically unsaturated moiety and at least one functional group capable of reacting with another functional group on a monomer to form a degradable crosslink, and combinations thereof. In the controlled release bleach thickening compositions, the solubility of the polymer is suppressed by crosslinking. Most of the polymer is isolated from degradation by the bleach, thus preventing degradation of the polymer backbone which destroys the thickening effect. Slow, but selective degradation of the polymer crosslinks acts to solubilize a small amount of polymer which functions as an efficient thickener. A continuous supply of the soluble polymer is established by this time release mechanism to replenish the soluble polymer as it is degraded by the bleach, thus maintaining the thickening effect after aging at elevated temperature.

17 Claims, 4 Drawing Sheets

CONTROLLED RELEASE BLEACH THICKENING COMPOSITION HAVING ENHANCED VISCOSITY STABILITY AT ELEVATED TEMPERATURES

FIELD OF THE INVENTION

The present invention relates to a controlled release bleach thickening composition comprising a crosslinked carboxylated polymer prepared from ethylenically unsaturated hydrophilic monomers, ethylenically unsaturated hydrophobic monomers, and a degradable crosslinking monomer having at least two ethylenically unsaturated moieties.

BACKGROUND OF THE INVENTION

Thickened aqueous bleach compositions are useful as bleaching solutions, disinfectants, hard surface cleaners and automatic dishwasher formulations. The problem with such bleach compositions, however, is that they suffer degradation and viscosity loss caused by chlorine at elevated temperatures.

Alkali soluble polyacrylate and polymethacrylate thickeners for aqueous solutions are well known. However, these have poor long term stability in alkaline, oxidative solutions such as cleaning formulations containing hypochlorite. EP 541203 describes a hypochlorite bleach containing automatic dishwashing gel thickened with CARBOPOL crosslinked polyacrylic acid. The function of the polyacrylate thickener in the gel is to expand and bind the water. U.S. Pat. No. 5,348,682 describes a CARBOPOL polyacrylic acid or ACRYSOL ICS-1 (polyEA/MAA) bleach thickening composition. EP 636689 describes a bleach composition containing a halogen or peroxy bleach material, surfactant, and a non-crosslinked polymer. The polymeric thickener is prepared from a charged hydrophilic monomer and an uncharged hydrophobic monomer. However, those skilled in the art will recognize that this formulation will not have long term stability as measured by the accelerated aging tests.

U.S. Pat. No. 5,169,552 and U.S. Pat. No. 5,384,061 describes the addition of benzoic acid or its derivatives as radical scavengers to prevent viscosity drop during accelerated aging by protecting CARBOPOL resins from oxidation by the hypochlorite. U.S. Pat. No. 4,867,896 describes CARBOPOL analogues that maintained the formulation viscosity solution by replacing the multifunctional sucrose allyl ether and pentaerythritol allyl ester crosslinkers with crosslinkers such as divinyl benzene or 1,2,4-trivinyl cyclohexane which are relatively inert to degradation by alkaline hypochlorite.

U.S. Pat. No. 4,839,077 describes the use of mixed surfactant systems to build viscosity of hypochlorite solutions wherein the addition of small amounts of ethylene/acrylic acid polymer causes a synergistic viscosity increase greater than can be obtained by surfactant thickening alone. The polymer is relatively low molecular weight, not crosslinked and has poor solubility requiring the presence of surfactants, particularly a nonionic such as amine oxide, to be soluble. These formulations have moderate heat aging stability as shown by a 50% loss in viscosity after 4 weeks at 100° F.

EP 636691 describes the use of a non-crosslinked styrene-methacrylic acid polymer to thicken hypochlorite/surfactant solutions wherein cross-linking the polymer gave higher viscosity but decreased clarity of the solution. These thickened solutions lacked long term stability loosing 50% of their viscosity after 6 weeks at room temperature.

For these reasons, there continues to be a need for a controlled release bleach thickening composition which maintains a thickening effect even at temperatures approaching 120° F. for three to four weeks.

SUMMARY OF THE INVENTION

A controlled release bleach thickening composition comprising bleach, water, and 0.1 to 50 weight percent, based on the total weight of the controlled release bleach thickening composition, of at least one crosslinked carboxylated polymer which is prepared from 30 to 80 weight percent of at least one ethylenically unsaturated hydrophilic monomer, from 20 to 70 weight percent of at least one ethylenically unsaturated hydrophobic monomer, and from about 0.5 to about 10 weight percent of a degradable crosslinking monomer selected from the group consisting of a crosslinking monomer having at least two ethylenically unsaturated moieties, a crosslinking monomer having at least one ethylenically unsaturated moiety and at least one functional group capable of reacting with another functional group on a monomer to form a degradable crosslink, and combinations thereof, wherein the weight percents are based on the total weight of monomer used to prepare the crosslinked carboxylated polymer.

In the controlled release bleach thickening composition of the invention, the solubility of the polymer is suppressed by crosslinking. Most of the polymer is isolated from degradation by the bleach, thus preventing degradation of the polymer backbone which reduces molecular weight and destroys the thickening effect. Slow but selective degradation of the polymer crosslinks acts to solubilize a small amount of polymer which functions as an efficient thickener. Once soluble, the polymer backbone will also slowly be degraded by the bleach. A continuous supply of the soluble polymer is established by this time release mechanism to replenish the soluble polymer as it is degraded by the bleach, thus maintaining the thickening effect after aging at elevated temperature for significantly longer than previously demonstrated in art.

In order to obtain a consistent viscosity over time it is preferable to have a mixture of polymers with different amounts or types of crosslinkers. Thus, the lightly crosslinked polymers provide initial viscosity while highly crosslinked polymers are less soluble and provide longer term reserves that are released more slowly.

BRIEF DESCRIPTION OF THE DRAWINGS

The above and other features of the invention will be further described in the following detailed specification considered in conjunction with the accompanying drawings in which.

DESCRIPTION OF THE INVENTION

Figure 1:
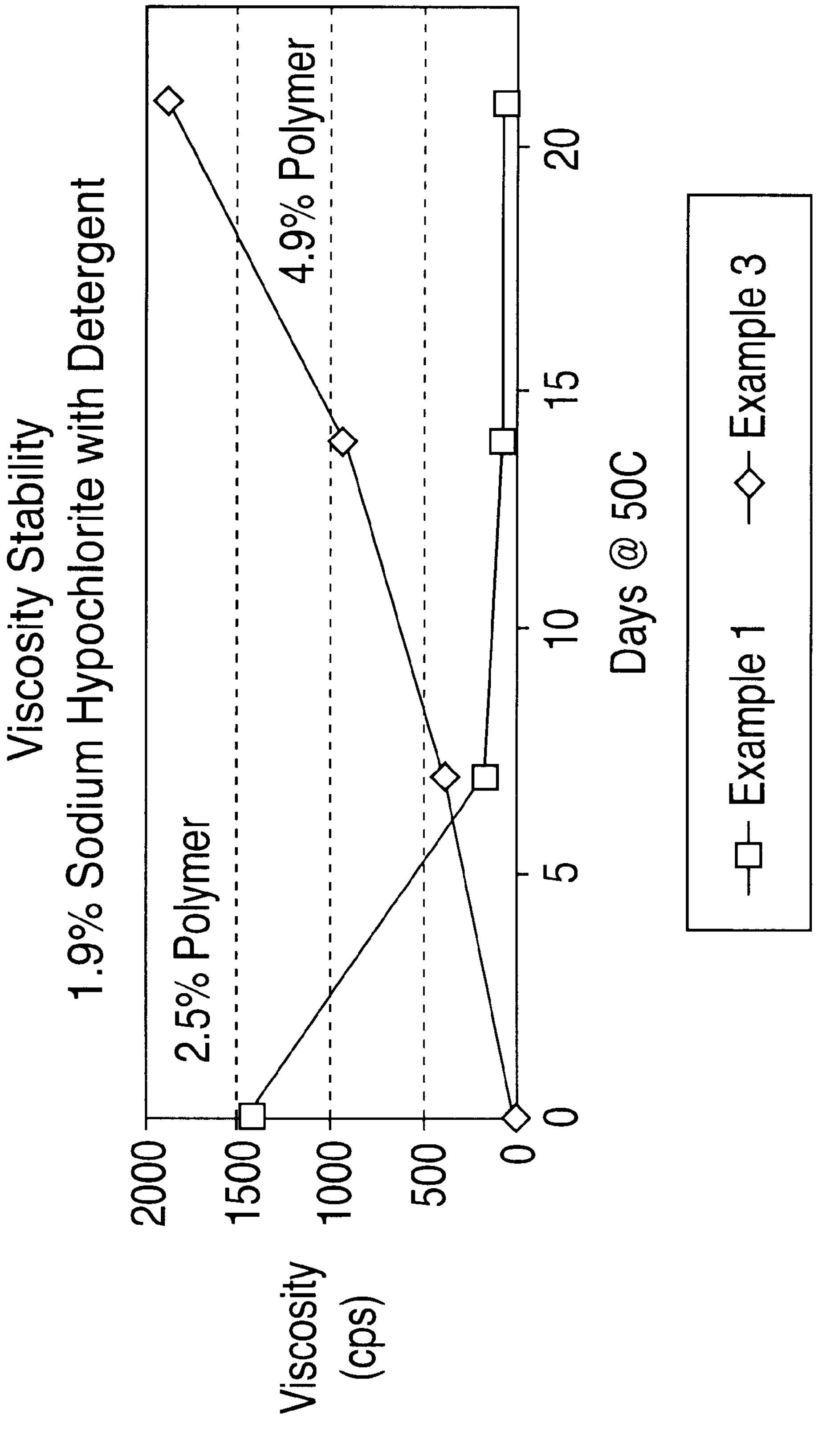
FIG. 1 is a graph illustrating viscosity vs. time of two polymers in a commercial detergent composition containing sodium hypochlorite without synergistic polymer/soap interactions.

The controlled release bleach thickening composition of the invention contains bleach, water, and a crosslinked carboxylated polymer. The crosslinked polymer is prepared by emulsion or solution polymerization. The crosslinked polymer is present in an amount of from 0.1 to 50 weight percent, preferably 1 to 25 weight percent, more preferably from 2 to 10 weight percent, based on the total weight of the controlled release bleach thickening composition. As used herein, "gradient crosslinked" means that the carboxylated polymer has different degrees of crosslinking as opposed to "homogenous crosslinking". Thus, depending on the degree of crosslinking, the polymers become soluble at different times in a bleach composition.

The crosslinked polymer is prepared from 30 to 80 weight percent of at least one ethylenically unsaturated hydrophilic monomer, from 20 to 70 weight percent of at least one ethylenically unsaturated hydrophobic monomer, and from about 0.5 to about 10 weight percent of a degradable crosslinking monomer, wherein the weight percents are based on the total weight of monomer used to prepare the polymer. As used herein, "degradable crosslinking monomer" means that the linkages formed by the crosslinking monomer are capable of being severed by alkaline hydrolysis or by reaction with bleach. An example of degradation at the crosslink is alkaline hydrolysis of polymerized esters, such as ethylene glycol dimethacrylate or diallyl maleate that form the crosslink. Preferably the polymer is prepared from 50 to 70 weight percent of at least one hydrophilic monomer, from 30 to 50 weight percent of at least one hydrophobic monomer, and from about 1 to about 5 weight percent of a degradable crosslinking monomer.

The degradable crosslinking monomer is selected from a crosslinking monomer having at least two ethylenically unsaturated moieties, or a crosslinking monomer having at least one ethylenically unsaturated moiety and at least one functional group capable of reacting with another functional group on a monomer to form a degradable crosslink. It is within the scope of the invention that the degradable crosslink is generated in-situ or after polymerization of the ethylenically unsaturated hydrophilic monomer and the ethylenically unsaturated hydrophobic monomer. For example, glycidyl methacrylate contains an epoxide ring that can react with methacrylic acid such that the polymer of the invention can be polymerized at low temperature, and the temperature can be raised to activate crosslinking. The result is an ester crosslink that is degradable by alkaline hydrolysis. Combinations of degradable crosslinking monomers may also be used.

The polymers of the invention can be crosslinked by any possible chemical link, although the following types of linkages are preferred:

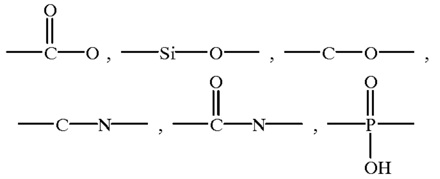

Preferably, the degradable crosslinking monomer is selected from esters of acrylic acid, esters of methacrylic acid, esters of maleic acid, esters of crotonic acid, esters with allyl or methallyl alcohol, allyl ethers or vinyl ethers of polyethylene glycol, allyl sucrose ethers, thioesters, thioamides, unsaturated epoxides, isocyanates, and silanes. Specific examples of crosslinking monomers are glycidyl methacrylate, 2-isocyanatoethyl methacrylate, α,α-dimethyl meta-isopropenyl benzyl isocyanate, vinyltrimethoxysilane, gamma-methacryloxypropyltrimethoxysilane, ethyleneglycol dimethacrylate, polyethyleneglycol diacrylate, butanediol diacrylate, pentaerythritol tetraacrylate, trimethylolpropane triacrylate, diallyl phthalate, diallyl maleate, allyl methacrylate, vinyl crotonate, triallyl cyanurate, diallyl phosphate, ethanedithiol diacrylate, N-methylol acrylamide, and N,N'-methylene-bis-acrylamide. Most preferably, the degradable crosslinking monomer is diallyl maleate or ethyleneglycol dimethacrylate.

The crosslinked polymer is prepared from at least one ethylenically unsaturated hydrophilic monomer selected from acids, preferably $C_1$–$C_6$ acids, amides, ethers, alcohols, aldehydes, ketones and esters. Preferably the ethylenically unsaturated hydrophilic monomers are mono-unsaturated. Combinations of ethylenically unsaturated hydrophilic monomers may also be used. Preferably the ethylenically unsaturated hydrophilic monomers are sufficiently water soluble to form at least a 5% by weight solution in water.

Specific examples of ethylenically unsaturated hydrophilic monomers are acrylic acid, methacrylic acid, ethacrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, 2-acryloxypropionic acid, 2-acrylamido-2-methyl propane sulfonic acid, vinyl sulfonic acid, vinyl phosphonic acid, 2-hydroxy ethyl acrylate, sodium methallyl sulfonate, sulfonated styrene, allyloxybenzenesulfonic acid, dimethylacrylamide, dimethylaminopropylmethacrylate, diethylaminopropylmethacrylate, vinyl formamide, vinyl acetamide, polyethylene glycol esters of acrylic acid and methacrylic acid and itaconic acid, vinyl pyrrolidone, and vinyl imidazole. Preferably, the ethylenically unsaturated hydrophilic monomer is selected from methacrylic acid or acrylic acid.

The crosslinked polymer is prepared from at least one ethylenically unsaturated hydrophobic monomer. Preferably less than 20 g/l, more preferably less than 5 g/l, most preferably less than 1 g/l of the hydrophobic monomer will dissolve in water at ambient temperature and a pH of 3.0 to 12.5. Preferably the ethylenically unsaturated hydrophobic monomer is selected from unsaturated alkyl and alkoxy chains, e.g. having from 5 to 24 carbon atoms, preferably from 6 to 18 carbon atoms, most preferred from 8 to 16 carbon atoms. Combinations of hydrophobic monomers may also be used.

Specific examples of ethylenically unsaturated hydrophobic monomers are styrene, α-methyl styrene, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, methyl methacrylate, ethyl acrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene. A preferred hydrophobic monomer is styrene.

The bleach which is used in the controlled release bleach thickening compositions is selected from various halogen bleaches. Examples of such bleaches include the alkali metal and alkaline earth salts of hypohalite, haloamines, haloimines, haloimides and haloamides. A preferred hypohalite is hypochlorite and compounds producing hypochlorite in aqueous solution. Suitable hypochlorite-producing compounds include sodium, potassium, lithium and calcium hypochlorite, chlorinated trisodium phosphate dodecahydrate, potassium and sodium dichloroisocyanurate and trichlorocyanuric acid. Organic bleach sources suitable for use include heterocyclic N-bromo and N-chloro imides such as trichlorocyanuric and tribromocyanuric acid, dibromo- and dichlorocyanuric acid, and potassium and sodium salts thereof, N-brominated and N-chlorinated succinimide, malonimide, phthalimide and naphthalimide. Also suitable are hydantoins, such as dibromo- and dichloro dimethylhydantoin, chlorobromodimethyl hydantoin, N-chlorosulfamide (haloamide) and chloramine (haloamine). Particularly preferred is sodium hypochlorite having the formula NaOCl, in an amount ranging from about 0.2% to about 15% by weight, more preferably from about 0.2% to about 10% by weight, and most preferably from about 1% to about 5%.

In one embodiment of the invention, the controlled release or time release bleach thickening compositions are useful for thickening structured surfactant solutions containing halogen bleach. Such structured surfactant solutions contain surfactants in high concentration in order to achieve some viscosity, typically on the order of 50–1000 cps. A polymeric thickener may be added to reduce the amount of surfactant needed to achieve the desired viscosity or to increase the viscosity beyond what can be obtained by concentrated surfactant alone. However, the presence of soluble polymer may adversely effect the interactions of the surfactant and result in a viscosity decrease. In order to load enough polymer into a structured soap/bleach solution for long term viscosification, it is preferred to suppress the polymer solubility through degradable crosslinking.

The controlled release bleach thickening composition may optionally contain surfactants and/or clays as viscosity enhancers which provide a synergistic thickening effect with the crosslinked carboxylated polymer. The surfactants and/or clays preferably are resistant to degradation by the bleach. Suitable surfactants include nonionic, anionic, cationic, and amphoteric surfactants. Suitable surfactants for the controlled release bleach thickening compositions include soaps. The surfactants are optionally present in an amount of from about 0 to about 50 weight percent, preferably from about 2 to about 45 weight percent, and more preferably from about 5 to about 40 weight percent of the controlled release bleach thickening composition.

Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates or from $C_{12}$ to $C_{16}$ sulfated ethoxylated alkanols.

Nonionic surfactants include, for example, from $C_6$ to $C_{12}$ alkylphenol ethoxylates, from $C_{12}$ to $C_{20}$ alkanol alkoxylates, and block polymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Cationic surfactants contain hydrophilic functional groups where the charge of the functional groups are positive when dissolved or dispersed in an aqueous solution. Typical cationic surfactants include, for example, amine compounds, oxygen containing amines, and quaternary amine salts.

Amphoteric surfactants contain both acidic and basic hydrophilic groups. Amphoteric surfactants are preferably derivatives of secondary and tertiary amines, derivatives of quaternary ammonium, quaternary phosphonium or tertiary sulfonium compounds. The cationic atom in the quaternary compound can be part of a heterocyclic ring. The amphoteric surfactant preferably contains at least one aliphatic group, containing about 3 to about 18 carbon atoms. At least one aliphatic group preferably contains an anionic water-solubilizing group such as a carboxy, sulfonate, or phosphono.

Generally, anionic surfactants, such as linear alkyl sulfonates (LAS), for example, sodium lauryl ether sulfate, or nonionic surfactants such as amine oxides, for example, AMMONYX L0 and AMMONYX MO, available from Stepan Chemical Company, and acyl sarcosinates such as HAMPOSYL-L (n-lauroyl sarcosine) available from Hampshire Chemical Company, are preferred for use in the controlled release bleach thickening compositions.

The controlled release bleach thickening compositions may optionally include an electrolyte. Low levels of electrolytes such as sodium chloride function to provide ions in aqueous solution and have been shown to improve solution viscosity. Sodium chloride is generally present in sodium hypochlorite as available commercially, or may be added to the composition in appropriate amounts such that the stability of the sodium hypochlorite will not be adversely affected.

The controlled release bleach thickening composition may also optionally include buffer, to maintain pH. Alkaline pHs, typically between 11 and 14, e.g., about 13, are generally appropriate to achieve desired viscosity and stability. Some reagents function both as electrolyte and buffer.

The controlled release bleach thickening compositions may further comprise at least one additive. Suitable additives may include, for example, dye transfer inhibitors, anticorrosion materials, antistatic agents, optical brighteners, perfumes, fragrances, dyes, fillers, chelating agents, fabric whiteners, brighteners, sudsing control agents, buffering agents, soil release agents, fabric softening agents, and combinations thereof. In general, such additives and their amounts are known to those skilled in the art.

While not wishing to be bound by any particular theory, the inventors believe that in the controlled release bleach thickening compositions, the crosslinked emulsion polymer solubility is suppressed such that the polymer initially only minimally, if at all, thickens the bleach solution. However, as the alkaline bleach solution degrades the crosslinked moieties of the polymer, the crosslinked polymer gradually solublizes and thickens the bleach solution. Preferably the rate of solubilization of the polymer in the bleach solution is greater than, or equal to, the rate at which the bleach degrades the soluble polymer.

It is necessary to have a crosslinked polymer with suppressed solubility in order to add high levels of polymer so there is enough reserve polymer to release over time. In order to obtain a consistent viscosity over time it is preferable to have a mixture of polymers with different amounts or types of crosslinkers. Thus, lightly crosslinked polymers provide initial viscosity while highly crosslinked polymers are less soluble and provide longer term reserves that are released more slowly.

The following nonlimiting examples illustrate further aspects of the invention. Unless otherwise specified in the following examples, the viscosity of the solutions was determined by means of a Brookfield viscometer at 25° C.

EXAMPLE 1

Comparative Example

Non-crosslinked Polymer

PPE-1196 is a non-crosslinked alkali soluble emulsion polymer containing approximately 46% styrene and 54% methacrylic acid, available from National Starch and Chemical Company. The polymer had a 30% solids content.

EXAMPLE 2

Preparation of Homogeneously Crosslinked Carboxylated Polymer

A 1-liter, four necked reaction vessel was equipped with a stirrer, thermometer, catalyst addition funnel, nitrogen blanket setup and a pump to transfer monomer from a continuously agitated container. An initial charge containing 300 grams of water, 3.0 grams of sodium dodecylbenzene-sulfonate and 0.1 grams of 2-acrylamido-2-methyl propane-sulfonic acid was prepared and after nitrogen purge was complete, the initial charge was added to the vessel and heated to 80° C. with continuous stirring throughout the reaction. While keeping vessel under a nitrogen atmosphere, a monomer emulsion consisting of 300 grams of water, 2.5 grams of sodium dodecylbenzenesulfonate, 150.0 grams of styrene, 65.0 grams of methacrylic acid, 65.0 grams of acrylic acid, 0.5 grams of 2-acrylamido-2-methyl propane-sulfonic acid, 4 grams of ethylene glycol dimethacrylate and 10.0 grams of behenyl (25) POE itaconate ½ ester was prepared. Emulsification was maintained through constant mixing in the monomer mix tank.

An initiator solution was prepared using 0.9 grams of sodium persulfate in 125 grams of water. A portion of the monomer emulsion, 30 grams, was added to the heated vessel. After 5 minutes, 35 grams of the persulfate solution was added and the vessel contents are allowed to react for 10 minutes. Then the remaining monomer emulsion was added over a 3-hour period with the remaining persulfate solution added simultaneously over 3 and ½ hours.

After completion of the monomer feed, the latex was scavenged with a solution containing 0.5 grams of 70% tert-butyl hydrogen peroxide in 11.0 grams of water added as a single shot. Once persulfate solution was complete, a scavenger solution containing 0.7 grams of erythorbic acid in 11.0 grams of water was added over 15 minutes. The latex was held at 80° C. for 30 minutes, cooled to 40° C. and filtered to remove any coagulum formed. The filtered latex was determined to have a 27.5% solids content.

EXAMPLE 3

Preparation of Homogeneously Crosslinked Carboxylated Polymer

A polymer was prepared according to the procedure set forth in Example 2 except that 7.0 grams of ethylene glycol dimethacrylate was used. The filtered latex was determined to have a 28.4% solids content.

The polymers prepared in Examples 1 and 3 were evaluated in CLOROX CLEANUP, a commercially available detergent composition, containing 1.9 weight percent of sodium hypochlorite and a small amount of surfactant. This solution was thickened with either 2.5% of the thickener from Example 1 containing no cross-linker or 4.9% of a highly cross-linked alkali soluble emulsion from Example 3. After addition of polymer the pH of the solution was raised to approximately 12.5, and the polymer samples were stored at 50° C. for up to three weeks. The test results are summarized in Table I and in FIG. 1.

TABLE I

| Polymer | Polymer Concentration (wt %) | Viscosity (cps) 0 Days | Viscosity (cps) 7 Days | Viscosity (cps) 14 Days | Viscosity (cps) 21 Days |
|---|---|---|---|---|---|
| Example 1 | 2.5% | 1430 | 167 | 88 | 64 |
| Example 3 | 4.9% | 25 | 383 | 923 | 1878 |

The test results in Table I show that a conventional, non-crosslinked alkali soluble emulsion thickener (Example 1) is quickly degraded and loses viscosity in a hypochlorite bleach formulation, while a highly crosslinked, time released polymer (Example 3) is able to viscosify the solution even after 3 weeks at 50° C. which simulates aging for several months. The graph shows that the noncrosslinked polymer of Example 1 was totally degraded in 7 days. However, the crosslinked polymer of Example 3 continued to thickened the detergent composition even after 21 days.

EXAMPLE 4

Preparation of Homogeneously Crosslinked Carboxylated Polymer

A polymer was prepared according to the procedure set forth in Example 2 except that the following amounts of reactants were different in the monomer mixture; 132.0 grams of styrene, 74.0 grams of methacrylic acid, and 74.0 grams of acrylic acid, 10.0 grams of ethylene glycol dimethacrylate and 14.0 grams of behenyl (25) POE itaconate ½ ester. The filtered latex was determined to have a 25.7% solids content.

EXAMPLE 5

Preparation of Gradient Crosslinked Carboxylated Polymer

A 1-liter, four necked reaction vessel was equipped with a stirrer, thermometer, catalyst addition funnel, nitrogen blanket setup and a pump to transfer monomer from a continuously agitated container. An initial charge containing 390.66 grams of water, 8.62 grams of CRODAFOS N3A, 13.81 grams of RHODASURF LA-3 and 3.37 grams of a 0.910 molar solution of ammonia was prepared. After nitrogen purge was complete, the initial charge was added to the vessel and heated to 65° C. While keeping vessel under a nitrogen atmosphere, a monomer emulsion consisting of 215.54 grams of water, 8.62 grams of CRODAFOS N3A, 13.81 grams of RHODASURF LA-3, 74.90 grams of styrene, 165.36 grams of methacrylic acid was prepared. Emulsification was maintained through constant mixing in the monomer mix tank.

Three equivalent doses of crosslinker, diallyl maleate, at 1.81 grams each were prepared. An initial catalyst solution containing 0.20 grams of sodium persulfate in 16.84 grams of water was prepared. An initial monomer mixture of 8.62 grams of styrene and 12.12 grams of methacrylic acid was prepared. Initial monomer mixture was added to the heated initial charge and mixed for 5 minutes. Next, the initial catalyst was added and the reaction was stirred while the reaction temperature was raised to 80° C. and then held at 80° C. for 15 minutes. Remaining monomer emulsion was added over a 4 hour period with addition of 1.81 grams diallyl maleate to the monomer mix tank occurring when ¼, ½ and ¾ of monomer emulsion has been feed to reaction vessel. Slow add of a persulfate solution consisting of 0.27 grams of persulfate and 60.62 grams of water was added simultaneously over 4 and ½ hours.

After completion of the monomer feed, the latex was scavenged with a solution of 0.07 grams of sodium persulfate in 20.21 grams of water added over 1 hour. Latex was cooled to 40° C. and filtered to remove any coagulum formed. The filtered latex was determined to have a pH of 2.43 and a 30.5% solids content and an average particle size of 161 nm.

EXAMPLE 6

Preparation of Gradient Crosslinked Carboxylated Polymer

A polymer was prepared according to the procedure set forth in Example 5 except that 2.25 grams of diallyl maleate was added to the monomer mix tank when ¼, ½ and ¾ of monomer emulsion had been fed to reaction vessel. The filtered latex was determined to have a 30.6% solids content.

EXAMPLE 7

Preparation of Gradient Crosslinked Carboxylated Polymer

A polymer was prepared according to the procedure set forth in Example 5 except that 3.05 grams of diallyl maleate was added to the monomer mix tank when ¼, ½ and ¾ of monomer emulsion had been fed to reaction vessel. The filtered latex was determined to have a 30.6% solids content.

EXAMPLE 8

Preparation of Gradient Crosslinked Carboxylated Polymer

An initial charge containing 391 grams of water, 9.4 grams of CRODAFOS N3A, 13.9 grams of RHODASURF LA-3 and 3.4 grams of a 0.910 molar solution of ammonia is prepared. After nitrogen purge was complete, the initial charge was added to the vessel and heated to 65° C. While keeping vessel under a nitrogen atmosphere, a monomer emulsion consisting of 215 grams of water, 8.6 grams of CRODAFOS N3A, 13.8 grams of RHODASURF LA-3, 79.30 grams of styrene, 171.45 grams of methacrylic acid was prepared. Emulsification was maintained through constant mixing in the monomer mix tank. Three equivalent doses of a mixture of 1.02 grams of ethylene glycol dimethacrylate and 1.02 grams of diallyl maleate each were prepared.

An initial catalyst solution containing 0.2 grams of sodium persulfate in 16.8 grams of water was prepared. An initial monomer mixture of 4.3 grams of styrene and 6.05 grams of methacrylic acid was prepared. Initial monomer mixture was added to the heated initial charge and mixed for 5 minutes. Next, the initial catalyst was added and the reaction was stirred while the reaction temperature was raised to 80° C. and then held at 80° C. for 15 minutes. Polymerization should be initiated and was visible as a change in solution opacity. Remaining monomer emulsion was added over a 3 hour period with addition of 2.04 grams of the diallyl maleate/ethylene glycol dimethacrylate mixture to the monomer mix tank occurring when ¼, ½ and ¾ of monomer emulsion has been feed to reaction vessel. Slow add of a persulfate solution consisting of 0.27 grams of persulfate and 60.6 grams of water was added simultaneously over 3 and ½ hours. Upon completion of monomer addition a solution of 0.1 grams of 70% tert-butyl hydrogen peroxide in 2.0 grams of water was added to the reaction. Upon completion of the catalyst addition a final scavenge of 0.1 grams of erythorbic acid in 10 grams of water was added over 30 minutes. Latex was cooled to 40° C. and filtered to remove any coagulum formed. The filtered latex was determined to have a 30.0% solids content.

EXAMPLE 9

Preparation of Gradient Crosslinked Carboxylated Polymer

A polymer was prepared according to the procedure set forth in Example 8 except that the following amounts were used in the monomer slow add: 150.0 grams of methacrylic acid and 100.0 grams of styrene. The filtered latex was determined to have a 29.8% solids content.

EXAMPLE 10

The polymers prepared in Examples 5, 8, and 9 were solubilized in an aqueous solution containing 1.9% sodium chloride, 2.9 to 3.7% polymer and approximately 1 gram sodium hydroxide per dry gram polymer, then the pH was raised to 13.0 with sodium hydroxide. The solutions were stored at 50° C. The test results are summarized in Table II.

TABLE II

| Polymer | Polymer Concentration (wt %) | Viscosity (cps) 0 Days | Viscosity (cps) 7 Days | Viscosity (cps) 14 Days | Viscosity (cps) 21 Days |
|---|---|---|---|---|---|
| Example 5 | 2.9% | 1948 | 18,960 | 19,040 | 19,520 |
| Example 8 | 3.2% | 1,568 | 31,680 | 33,920 | 36,480 |
| Example 9 | 3.7% | 3,012 | 60,960 | 66,480 | 73,920 |

The results in Table II show that the polymers of the invention continue to thicken alkaline aqueous solutions even after 21 days. The alkalinity of the solution selectively degrades the polymer crosslinker that suppresses the polymer solubility, but does not degrade the polymer backbone to reduce viscosity. The results also show that the higher concentration of polymer in the alkaline solution has a greater thickening effect.

EXAMPLE 11

Alkali soluble emulsion polymers were solubilized in a aqueous solutions at 50° C. containing 1–3% sodium hypochlorite, 3.0–3.5% polymer and approximately 1 gram sodium hydroxide per dry gram polymer, then the pH was raised to 13.0 with sodium hydroxide. The solutions were stored at 50° C. The test results are summarized in Table III.

TABLE III

| Polymer | Bleach Concentration (wt %) | Viscosity (cps) 0 Days | Viscosity (cps) 7 Days | Viscosity (cps) 14 Days | Viscosity (cps) 21 Days |
|---|---|---|---|---|---|
| Example 1 | 1% | 2020 | 476 | 220 | 128 |
| Example 5 | 1% | 1336 | 1152 | 484 | 144 |
| Example 5 | 2% | 1828 | 924 | 288 | 104 |
| Example 5 | 3% | 1360 | 816 | 36 | 16 |

The results in Table III show that higher bleach concentrations degrade the polymers more quickly as compared to lower concentrations of bleach. However, the polymers of the present invention maintain a thickening effect on the bleach solution significantly longer than the noncrosslinked polymer prepared in Example 1. The polymer from Example 1 without crosslinker is rapidly degraded from 2020 cps to 476 cps after 7 days. The crosslinked polymer from Example 5 has an initial viscosity of 1336 cps, yet its time released action maintains viscosity over 7 days in 1% sodium hypochlorite. The results in Table III further show that the polymer from Example 5 does not contain enough crosslinker to allow for a long time release so viscosity drops steadily after 7 days.

EXAMPLE 12

Figure 2:
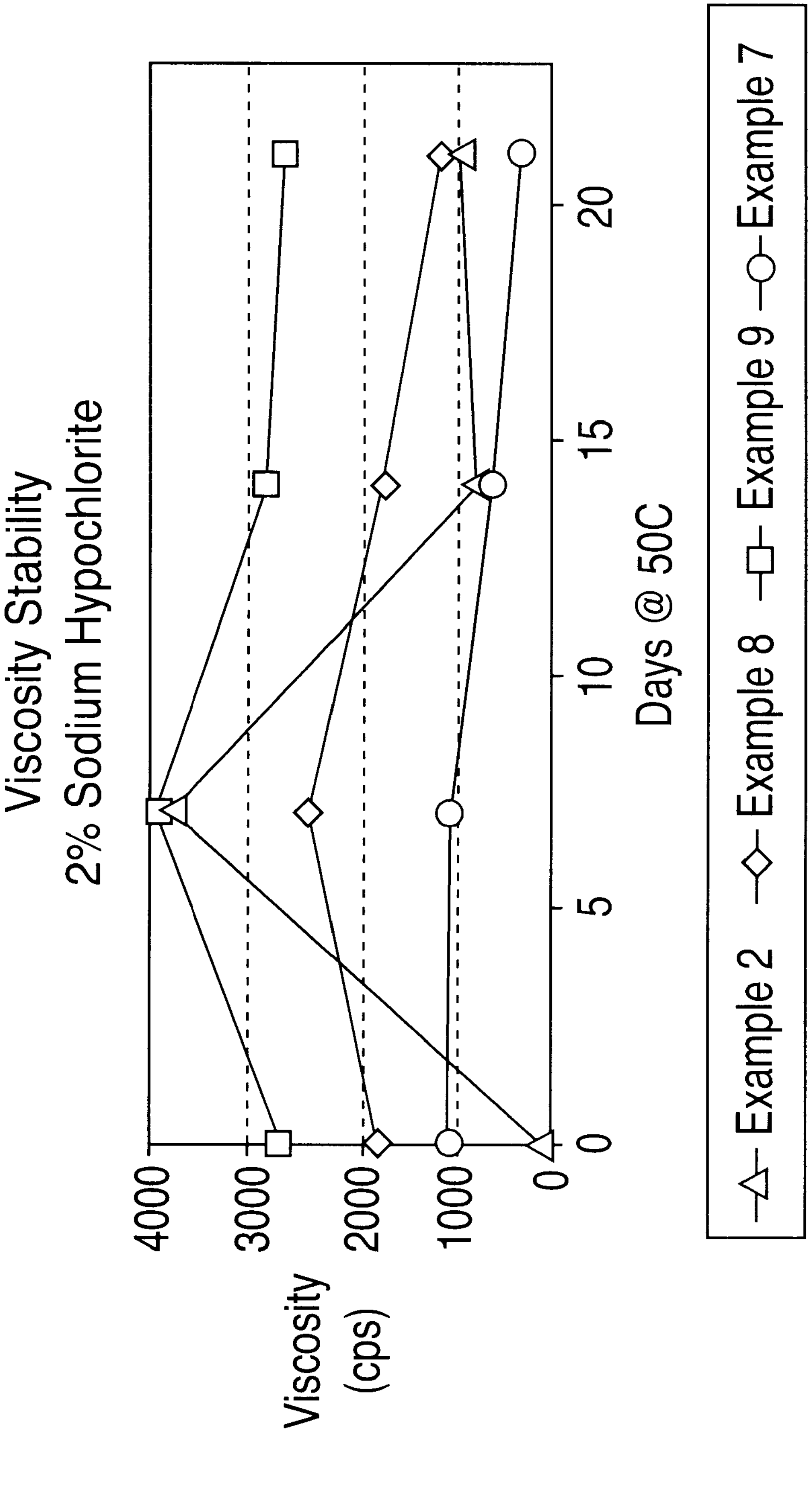
FIG. 2 is a graph illustrating viscosity vs. time of four polymers in a 2% sodium hypochlorite solution without any detergents.

The alkali soluble emulsion polymers prepared in Examples 2, 7, 8, and 9 were solubilized in a aqueous solutions containing 1–3% sodium hypochlorite, 3.0–3.5% polymer and approximately 1 gram sodium hydroxide per dry gram polymer, then the pH was raised to 13 with sodium hydroxide. The solutions were stored at 50° C. The test results are summarized in Tables IV, V, and VI. FIG. 2 is a graph of the results in Table V.

TABLE IV

| Polymer | Bleach Concentration (wt %) | Viscosity (cps) 0 Days | Viscosity (cps) 7 Days | Viscosity (cps) 14 Days | Viscosity (cps) 21 Days |
|---|---|---|---|---|---|
| Example 2 | 1% | 96 | 976 | 428 | 188 |
| Example 7 | 1% | 562 | 788 | 576 | 368 |
| Example 8 | 1% | 1380 | 2748 | 2032 | 1540 |
| Example 9 | 1% | 1068 | 2844 | 2252 | 1944 |

TABLE V

| Polymer | Bleach Concentration (wt %) | Viscosity (cps) 0 Days | Viscosity (cps) 7 Days | Viscosity (cps) 14 Days | Viscosity (cps) 21 Days |
|---|---|---|---|---|---|
| Example 2 | 2% | 136 | 3,776 | 772 | 996 |
| Example 7 | 2% | 1,076 | 1,032 | 628 | 364 |
| Example 8 | 2% | 1,904 | 2,432 | 1,702 | 1,184 |
| Example 9 | 2% | 2,676 | 3,964 | 2,884 | 2,736 |

TABLE VI

| Polymer | Bleach Concentration (wt %) | Viscosity (cps) 0 Days | Viscosity (cps) 7 Days | Viscosity (cps) 14 Days | Viscosity (cps) 21 Days |
|---|---|---|---|---|---|
| Example 2 | 3% | 156 | 4,856 | 84 | 12 |
| Example 7 | 3% | 920 | 1,136 | 60 | 20 |
| Example 8 | 3% | 1,232 | 3,248 | 560 | 56 |
| Example 9 | 3% | 1,296 | 3,232 | 1,276 | 88 |

The results in Tables IV, V, and VI show that the polymers of the invention continue to thicken a 1–3% bleach solution even after 21 days at 50° C. The homogeneously polymer from Example 2 had its initial viscosity suppressed the most, yet it rapidly hydrolyzes and peaks in viscosity, followed by a rapid loss in viscosity. This behavior is worse as the bleach content increases. The gradient crosslinked polymers have better performance since the lightly crosslinked components provide an initial viscosity, while the higher crosslinked and more hydrolysis resistant fractions provide reserves for long term slow release.

After 21 days at 50° C. the 3% bleach samples with polymer still contained an average of 47% of the original bleach content. The 2% bleach samples with polymer contained 41% or the original amount and the 1% bleach samples with polymer averaged 35% of the original amount. Some of the alkyl ethoxylate surfactants present in the polymer synthesis are known to cause bleach degradation and are presumed to be the reason for what appears to be a fixed amount of bleach loss proportional to the amount of emulsion polymer added.

It is noted that alkaline conditions alone do not degrade the polymer, but that viscosity decreases are due to polymer decomposition caused by bleach.

EXAMPLE 13

Preparation of Homogeneously Crosslinked Carboxylated Polymer

A polymer was prepared according to the procedure set forth in Example 2 except that the ethylene glycol dimethacrylate crosslinker was excluded from the recipe. The filtered latex was determined to have a 26.8% solids content.

Figure 3:
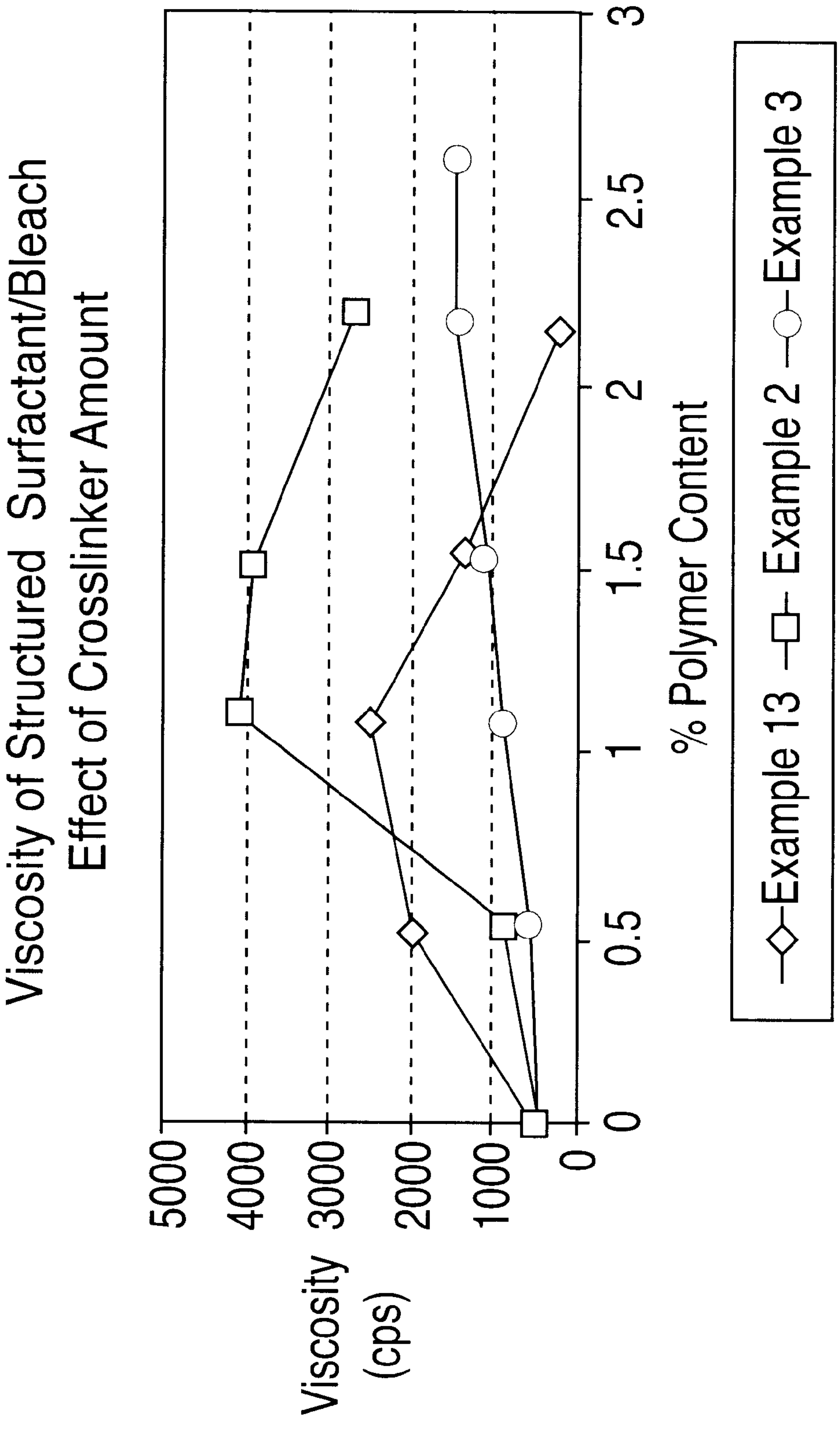
FIG. 3 is a graph illustrating viscosity vs. polymer percent in a detergent composition containing sodium hypochlorite with synergistic polymer/soap interactions.

The polymers prepared in Examples 2, 3 and 13 were added to Comet Gel which is a concentrated surfactant/bleach cleaning product with a viscosity of about 500 cps. The polymers were evaluated for their synergistic thickening effect at different concentrations in the Comet Gel. The test results are summarized in Table VII. FIG. 3 is a graph of Table VII.

TABLE VII

| Polymer | Visc. (cps) at 0% Conc. of Polymer | Visc. (cps) at 0.5% Conc. of Polymer | Visc. (cps) at 1.1% Conc. of Polymer | Visc. (cps) at 1.5% Conc. of Polymer | Visc. (cps) at 2.2% Conc. Of Polymer |
|---|---|---|---|---|---|
| Ex. 2 | 478 | 835 | 4060 | 3912 | 2674 |
| Ex. 3 | 478 | 516 | 880 | 1086 | 1450 |
| Ex. 13 | 478 | 1922 | 2497 | 1302 | 202 |

The results in Table VII show that the polymer from Example 13 which does not contain a degradable crosslinker causes a large increase in viscosity at a concentration of 0.5 and 1.1, but at a higher concentration of 1.5 and 2.2, the polymer interferes with surfactant structuring and causes the viscosity to drop even below the 478 cps viscosity of the solution without the polymer. The polymer from Example 2 is crosslinked according to the invention and although there is a peak in the viscosity, much more polymer can be added without dropping the formulation viscosity to the viscosity of the solution without the polymer. The polymer from Example 3 has its solubility suppressed more than the polymer of Example 2, thus high levels of this polymer may be added for an even longer time released thickening effect.

EXAMPLE 14

Evaluation of polymers prepared in Example 1 and Example 4 in bleach thickening compositions during accelerated aging storage at 50° C. (122° F.).

The crosslinked carboxylated polymer prepared in Example 4, 4.1 g was combined with 20 g of RHODAPEX ES-2 (a 25% solution of 2 mole % ethylene oxide lauryl ether sulfate surfactant) ("SLES"), 67 g distilled water, 4 g sodium hydroxide, and 100 g CLOROX liquid bleach (approximately 5.4% sodium hypochlorite). This yielded a 2.5% bleach solution thickened by the interaction of 2.5% of the surfactant and 0.53% crosslinked polymer. The solution had an initial viscosity of 330 cps and contained 2.5% sodium hypochlorite by assay. The pH was determined to be 13.0. The solution was turbid due to the insoluble crosslinked polymer.

The polymer from Example 1 containing no crosslinker was also evaluated under similar conditions except 2.9% RHODAPEX ES-2 was used and less polymer was required. The test results are summarized in Table VIII.

TABLE VIII

| Polymer | Conc. Polymer/ SLES (wt %) | Visc. (cps) 0 Days | Visc. (cps) 5 Days | Visc. (cps) 13 Days | Visc. (cps) 19 Days | Visc. (cps) 22 Days | Visc. (cps) 27 Days |
|---|---|---|---|---|---|---|---|
| Example 4 | 0.53%/ 2.5% | 332 | 520 | 425 | 357 | 268 | 105 |
| Example 1 | 0.28%/ 2.9% | 1735 | 563 | 125 | | | |

The test results in Table VIII show that the Example 4 polymer prepared according to the invention continued to thickened the bleach thickening composition up to three weeks. After 22 days, the sodium hypochlorite content was 1.4%. The test results also show that the noncrosslinked polymer prepared in Example 1 was unacceptable because the bleach solution rapidly lost all viscosity over the first 13 days.

EXAMPLE 15

Preparation of Bleach Thickening Composition

Figure 4:
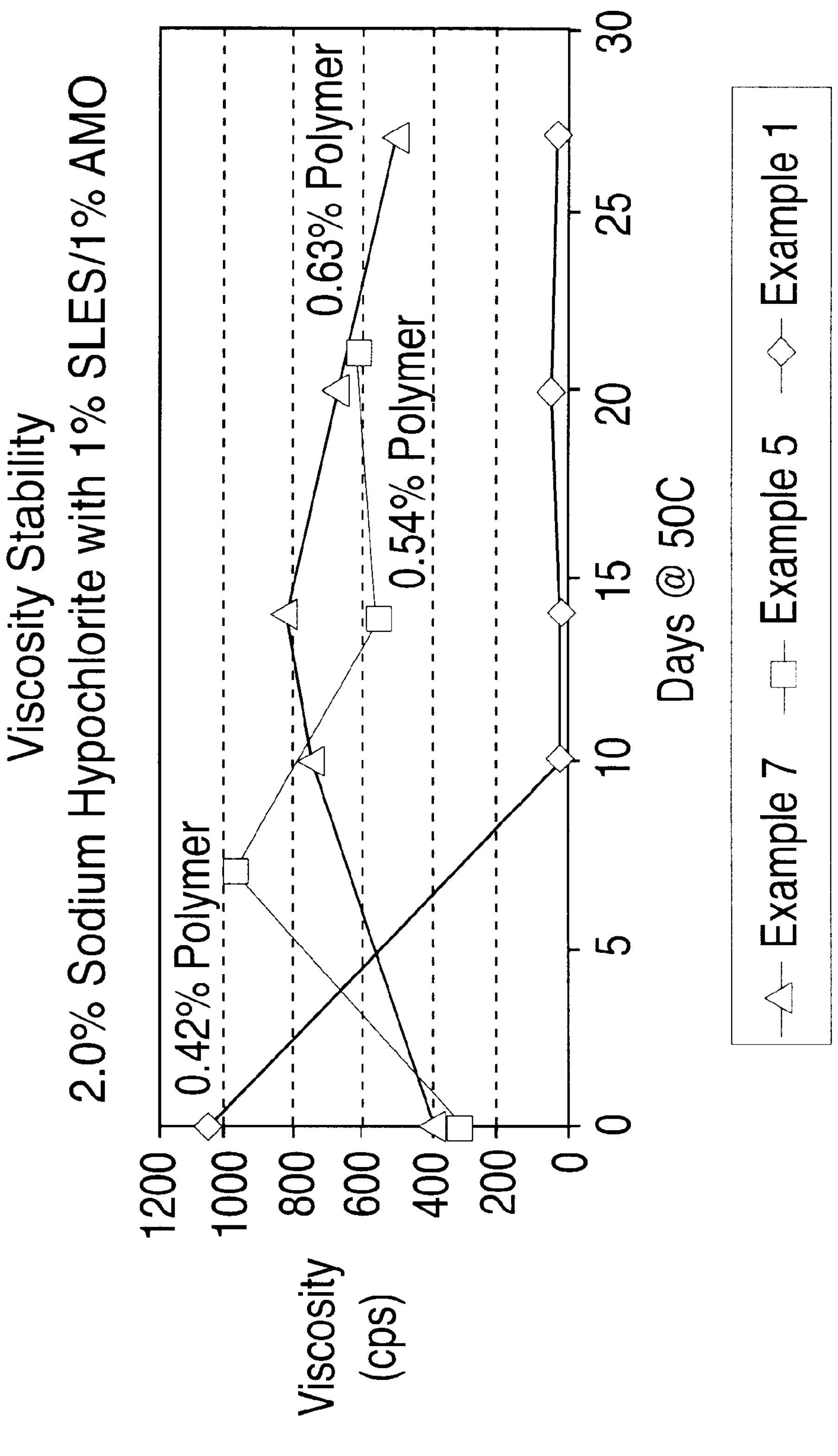
FIG. 4 is a graph illustrating viscosity vs. time of three polymers in a 2% sodium hypochlorite/1% amine oxide/1% sodium lauryl ether sulfate solution .

A 2% sodium hypochlorite solution containing a mixed surfactant system was prepared by mixing 75 g Clorox Bleach (approximately 5.4% sodium hypochlorite), 2.15 g sodium hydroxide, 97 g distilled water, 7.5 g RHODAPEX ES-2 (25% active) and 6.5 g AMMONYX MO (30% active). This solution typically gave a viscosity of 75–150 cps. To 60 g of this solution was added 1.1 g of the emulsion polymer in example 5 (30% solids). The pH of the mixture was adjusted 4o 13.0 and the viscosity had increased to 310 cps. The sample was placed in an oven at 50° C. and removed periodically to test viscosity and hypochlorite content. This procedure was used to prepare samples with polymers from Examples 1, 5 and 7. The test results are summarized in Table IX. FIG. 4 is a graph of Table IX.

TABLE IX

| Polymer | Polymer (wt %) | Visc. (cps) 0 Day | Visc. (cps) 10 Day | Visc. (cps) 14 Day | Visc. (cps) 21 Day | Visc. (cps) 27 Day |
|---|---|---|---|---|---|---|
| Example 7 | 0.63 | 388 | 742 | 821 | 673 | 496 |
| Example 1 | 0.42 | 1052 | 20 | 20 | 39 | 20 |
| Example 5 | 0.54 | 310 | 973 | 551 | 619 | |

The test results in Table IX show that the polymer in Example 1 without crosslinker degraded rapidly and the mixture lost all viscosity after 10 days. The crosslinked polymers increased in viscosity initially then maintained a suitable viscous solution the 3–4 week test period. After 21 days, the hypochlorite content was 0.91% for the formulation with the polymer from Example 5 and 0.63% for the polymer from Example 7 after 27 days.

EXAMPLE 16

Preparation of Bleach Thickening Composition

Comet Gel is a commercially available thickened bleach composition which has approximately 0.9–1% sodium hypochlorite and is thickened with bleach stable surfactants to achieve a viscosity of 500 cps. The viscosity of Comet Gel was increased by adding 0.5–0.8% (dry basis) of the polymer thickeners from Examples 5 and 8 to achieve a viscosity of 1000 cps at a pH of 12.8–13 adjusted with 50% sodium hydroxide. The samples were stored for three weeks at 50° C. The test results are summarized in Table X.

TABLE X

| Polymer | Conc.of Polymer (wt %) | Viscosity (cps) 0 Days | Viscosity (cps) 7 Days | Viscosity (cps) 14 Days | Viscosity (cps) 21 Days |
|---|---|---|---|---|---|
| Example 8 | 0.78 | 1080 | 1060 | 980 | 1048 |
| Example 5 | 0.54 | 914 | 1312 | 1479 | 1750 |

The test results in Table X show that the polymer from Example 8 maintained viscosity constant at about 1000 cps for three weeks while the polymer from Example 5 resulted in a steady increase in viscosity. Thus, the polymer from Example 5 was solubilized faster than it was degraded. It was also determined that 80% of the original amount of hypochlorite remained after 21 days.

EXAMPLE 17

Preparation of Bleach Thickening Composition

The bleach content of Comet Gel was increased to 2.3% by mixing 40 g Comet Gel with 18 g Clorox Bleach (5.4% sodium hypochlorite) which gave a mixture with a viscosity of 330 cps. The mixture was formulated with 0.5% (dry basis) of the polymer thickeners from Examples 5 and 6 to obtain a viscosity of 800–1000 cps at a pH of 12.8–13 adjusted with 50% sodium hydroxide. The test results are summarized in Table XI.

TABLE XI

| Polymer | Polymer Conc. (wt %) | Visc. (cps) 0 Day | Visc. (cps) 7 Day | Visc. (cps) 12 Day | Visc. (cps) 21 Day | Visc. (cps) 28 Day | Visc. (cps) 35 Day | Visc. (cps) 46 Day |
|---|---|---|---|---|---|---|---|---|
| Ex. 5 | 0.5 | 428 | 767 | 826 | 968 | 939 | 653 | 477 |
| Ex. 6 | 0.5 | 767 | 1106 | 841 | 909 | 870 | 560 | 280 |

The test results in Table XI show that the highly crosslinked polymers from Examples 5 and 6 were compatible and produced homogeneous mixtures which maintained viscosity close to the target range for 4 weeks at 50° C. before decreasing. The high bleach concentration degraded the polymer from Example 5 fast enough that the viscosity is held nearly constant after the first week. It was also determined that 56% of the original bleach content remained after 21 days.

EXAMPLE 18

Effect of Non-degradable Crosslinker

A polymer was prepared according to the procedure set forth in Example 9 except that the ethylene glycol dimethacrylate and diallyl maleate crosslinkers were replaced with 0.63 g of divinyl benzene which was homogeneously mixed with the monomer slow-add at the beginning of the reaction. The filtered latex was determined to have a 30.0% solids content.

An alkaline solution at pH 13.0 was prepared containing 9.6 g of the polymer from Example 18 containing divinyl benzene which is a non-degradable crosslinker, 100 g of 2% sodium hypochlorite and 3 g of 50% sodium hydroxide. A separate alkaline solution at pH 13.3 was prepared from 11.6 g of the polymer from Example 18, 145 g distilled water, 5 g of 50% sodium hydroxide and 3 g sodium chloride. The test results are summarized in Table XII.

TABLE XII

| Polymer | Conc. of Polymer (wt %) | pH | Sodium Hypochlorite | Visc. (cps) 0 Days | Visc. (cps) 3 Days | Visc. (cps) 8 Days |
|---|---|---|---|---|---|---|
| Example 18 | 2.1% | 13.0 | Yes | 1,016 | 2,088 | 852 |
| Example 18 | 2.6% | 13.3 | No | 1,124 | 1,552 | 1,452 |

The test results in Table XII show that the viscosity of the polymer from Example 18 in alkaline solution without bleach only increased about 30% after the first week which indicated that the polymer crosslinks were stable to hydrolysis. In comparison, the degradable crosslinks in Example 10 produced a 10–20 fold viscosity increase. However, the polymer from Example 18 in bleach solution produced a two-fold increase after 3 days but rapidly lost viscosity after 8 days and resulted in a 16% decrease in viscosity which indicated that the polymer backbone is degrading without additional polymer being released and solubilized to compensate. The polymer in bleach solution produced a turbid solution which indicated there was polymer available for thickening, but it wasn't solubilized.

While the invention has been described with particular reference to certain embodiments thereof, it will be understood that changes and modifications may be made by those of ordinary skill in the art within the scope and spirit of the following claims.

What is claimed is:

1. A controlled release bleach thickening composition comprising a halogen bleach, water, and 0.1 to 50 weight percent, based on the total weight of the controlled release bleach thickening composition, of at least one crosslinked carboxylated polymer which is prepared from 30 to 80 weight percent of at least one ethylenically unsaturated hydrophilic monomer, from 20 to 70 weight percent of at least one ethylenically unsaturated hydrophobic monomer, and from about 0.5 to about 10 weight percent of a degradable crosslinking monomer selected from the group consisting of a crosslinking monomer having at least two ethylenically unsaturated moieties, a crosslinking monomer having at least one ethylenically unsaturated moiety and at least one functional group capable of reacting with another functional group on a monomer to form a degradable crosslink, and combinations thereof, wherein the weight percents are based on the total weight of monomer used to prepare the crosslinked carboxylated polymer, and wherein said bleach thickening composition has a pH of from 11 to 14.

2. The controlled release bleach thickening composition according to claim 1 wherein the crosslinked carboxylated polymer is prepared from 50 to 70 weight percent of at least one hydrophilic monomer, from 30 to 50 weight percent of at least one hydrophobic monomer, and from about 1 to about 5 weight percent of a degradable crosslinking monomer.

3. The controlled release bleach thickening composition according to claim 1 further comprising at least one additive selected from the group consisting of dye transfer inhibitors, anticorrosion materials, antistatic agents, optical brighteners, perfumes, fragrances, dyes, fillers, electrolytes, buffers, chelating agents, fabric whiteners, brighteners, sudsing control agents, buffering agents, soil release agents, fabric softening agents, and combinations thereof.

4. The controlled release bleach thickening composition according to claim 1 wherein the crosslinked carboxylated polymer is present in an amount of 1 to 10 weight percent, based on the total weight of the controlled release bleach thickening composition.

5. The controlled release bleach thickening composition according to claim 1 wherein the ethylenically unsaturated hydrophilic monomer is selected from the group consisting of acids, amides, ethers, alcohols, aldehydes, ketones, esters, and combinations thereof.

6. The controlled release bleach thickening composition according to claim 5 wherein the ethylenically unsaturated hydrophilic monomer is selected from the group consisting of acrylic acid, methacrylic acid, ethacrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, 2-acryloxypropionic acid, 2-acrylamido-2-methyl propane sulfonic acid, vinyl sulfonic acid, vinyl phosphonic acid, 2-hydroxy ethyl acrylate, trimethyl propane triacrylate, sodium methallyl sulfonate, sulfonated styrene, allyloxybenzenesulfonic acid, dimethylacrylamide, dimethylaminopropylmethacrylate, diethylaminopropylmethacrylate, vinyl formamide, vinyl acetamide, polyethylene glycol esters of acrylic acid and methacrylic acid and itaconic acid, vinyl pyrrolidone, and vinyl imidazole.

7. The controlled release bleach thickening composition according to claim 6 wherein the ethylenically unsaturated hydrophilic monomer is selected from the group consisting of methacrylic acid or acrylic acid.

8. The controlled release bleach thickening composition according to claim 1 wherein the ethylenically unsaturated hydrophobic monomer is selected from the group consisting of $C_1$–$C_{24}$ alkyl, $C_1$–$C_{24}$ alkoxy, alkylaryl, and combinations thereof.

9. The controlled release bleach thickening composition according to claim 8 wherein the ethylenically unsaturated hydrophobic monomer is selected from the group consisting of styrene, $\alpha$-methyl styrene, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, ethyl acrylate, and methyl methacrylate.

10. The controlled release bleach thickening composition according to claim 9 wherein the ethylenically unsaturated hydrophobic monomer is styrene.

11. The controlled release bleach thickening composition according to claim 1 further comprising at least one surfactant selected from the group consisting of anionic surfactants, cationic surfactants, nonionic surfactants, zwitterionic surfactants, and amphoteric surfactants.

12. The controlled release bleach thickening composition according to claim 11 wherein the surfactant is nonionic or anionic.

13. The controlled release bleach thickening composition according to claim 12 wherein the nonionic surfactant is an amine oxide.

14. The controlled release bleach thickening composition according to claim 12 wherein the anionic surfactant is sodium lauryl ether sulfate.

15. A controlled release bleach thickening composition comprising a halogen bleach, water, and 0.1 to 50 weight percent, based on the total weight of the controlled release bleach thickening composition, of at least one crosslinked carboxylated polymer which is prepared from 30 to 80 weight percent of at least one ethylenically unsaturated hydrophilic monomer, from 20 to 70 weight percent of at least one ethylenically unsaturated hydrophobic monomer, and from about 0.5 to about 10 weight percent of a degradable crosslinking monomer selected from the group consisting of esters of acrylic acid, esters of methacrylic acid, esters of maleic acid, esters of crotonic acid, esters with allyl or methallyl alcohol, allyl ethers, vinyl ethers, allyl sucrose ethers, thioamides, unsaturated epoxides, N-methylol acrylamide, isocyanates, and silanes, and wherein said bleach thickening composition has a pH of from 11 to 14.

16. The controlled release bleach thickening composition according to claim 15 wherein the degradable crosslinking monomer is selected from the group consisting of glycidyl methacrylate, 2-isocyanatoethyl methacrylate, α,α-dimethyl meta-isopropenyl benzyl isocyanate, vinyltrimethoxysilane, gamma-methacryloxypropyltrimethoxysilane, ethyleneglycol dimethacrylate, polyethyleneglycol diacrylate, butanediol diacrylate, pentaerythritol tetraacrylate, trimethylolpropane triacrylate, diallyl phthalate, diallyl maleate, allyl methacrylate, vinyl crotonate, triallyl cyanurate, diallyl phosphate, ethanedithiol diacrylate, and N,N'-methylene-bis-acrylamide.

17. The controlled release bleach thickening composition according to claim 16 wherein the degradable crosslinking monomer is diallyl maleate or ethyleneglycol dimethacrylate.

* * * * *